(12) United States Patent
Reiche

(10) Patent No.: US 9,138,809 B2
(45) Date of Patent: Sep. 22, 2015

(54) UNDER-FLOOR WHEELSET LATHE

(75) Inventor: Hans-Joachim Reiche, Erkrath (DE)

(73) Assignee: Hegenscheidt-MFD GmbH & Co. KG, Erkelenz (DE)

( * ) Notice: Subject to any disclaimer, the term of this patent is extended or adjusted under 35 U.S.C. 154(b) by 417 days.

(21) Appl. No.: 13/703,280

(22) PCT Filed: May 20, 2011

(86) PCT No.: PCT/DE2011/001092
§ 371 (c)(1),
(2), (4) Date: Dec. 10, 2012

(87) PCT Pub. No.: WO2011/147406
PCT Pub. Date: Dec. 1, 2011

(65) Prior Publication Data
US 2013/0112052 A1      May 9, 2013

(30) Foreign Application Priority Data
May 24, 2010    (DE) ..................... 20 2010 007 239 U

(51) Int. Cl.
*B23B 5/32*    (2006.01)

(52) U.S. Cl.
CPC .............. *B23B 5/32* (2013.01); *B23B 2260/096* (2013.01); *Y10T 82/185* (2015.01)

(58) Field of Classification Search
CPC ....... Y10T 82/18; Y10T 82/185; Y10T 82/21; Y10T 409/100636; Y10T 409/305656; Y10T 409/305712; Y10T 409/305768; Y10T 409/305824; Y10T 409/30588; B23B 5/04; B23B 5/28; B23B 5/32; B23B 2215/36; B23C 3/04; B23C 3/02; B23C 2215/36

USPC ............ 82/104, 105, 112; 409/146, 165, 166, 409/167, 168, 169; 451/49
See application file for complete search history.

(56) References Cited

FOREIGN PATENT DOCUMENTS

| DE | 223380 | A1 |   | 6/1985 |
|----|--------|----|---|--------|
| DE | 3823832 | C1 | * | 3/1989 |
| DE | 3809250 | C1 | * | 7/1989 |
| DE | 8817198 | U1 |   | 2/1994 |
| DE | 8817200 | U1 | * | 3/1994 |
| DE | 4320504 | A1 | * | 12/1994 |
| DE | 9414398 | U1 | * | 12/1994 |
| DE | 4330811 | A1 | * | 3/1995 |
| DE | 202007016469 | U1 |   | 3/2008 |
| DE | 202008009409 | U1 |   | 9/2008 |
| EP | 0332489 | A1 |   | 9/1989 |
| EP | 0711618 | A1 | * | 5/1996 |

* cited by examiner

*Primary Examiner* — Daniel Howell
*Assistant Examiner* — Alan Snyder
(74) *Attorney, Agent, or Firm* — Harness, Dickey & Pierce, P.L.C.

(57) ABSTRACT

The invention relates to the linear drive for the drive rollers (1, 1') of an under-floor wheelset lathe. The two drive rollers (1, 1'), which each form a roller pair, are connected to each other in a form-fit manner. The form-fit connection comprises two gear racks (17, 17') that engage with a common pinion (23), wherein the gear racks (17, 17') are each connected to one power cylinder (25, 25') and one intermediate lever (16, 16') in an articulated manner and are supported on the side opposite the engagement with the pinion (23) by a roller guide (26, 26').

6 Claims, 2 Drawing Sheets

UNDER-FLOOR WHEELSET LATHE

CROSS-REFERENCE TO RELATED APPLICATIONS

This application is a U.S. National Stage of International Application No. PCT/DE2011/001092, filed on May 20, 2011 and published in German as WO 2011/147406 on Dec. 1, 2011. This application claims the benefit of German Application No. 20 2010 007 239.5, filed on May 24, 2010. The disclosures of the above applications are incorporated herein by reference.

FIELD

The invention concerns an under-floor wheelset.

BACKGROUND

More specifically, the invention relates to the arrangement of the lift drive in the drive rollers of the under-floor wheelset lathe for the wheelset. Comparable solutions are already known from the DE 20 2007 016 469 and DE 20 2008 009 409.

SUMMARY

Compared to the known solutions, the task of the existing invention is to further reduce the construction height of the lift drive in the drive rollers and to offer a less expensive solution at the same time.

According to the invention, this task is solved by the positive connection between the two drive rollers (forming one roller pair) comprising of two toothed racks which engage in a joint pinion, whereby the toothed racks are both linked flexibly to one power cylinder and one intermediate lever respectively, and are supported by a roller guide on the respective side opposite to the pinion engagement.

Advantageous enhancements of this solution ensue from other various aspects, including where the power cylinders are arranged almost horizontally, the toothed racks are arranged almost horizontally, the toothed racks engage in the pinion from sides opposite one another, and a compression spring is arranged between a rocker lever and at least one respectively associated intermediate lever.

DRAWING

The drawings described herein are for illustrative purposes only of selected embodiments and not all possible implementations, and are not intended to limit the scope of the present disclosure.

Figure 1:
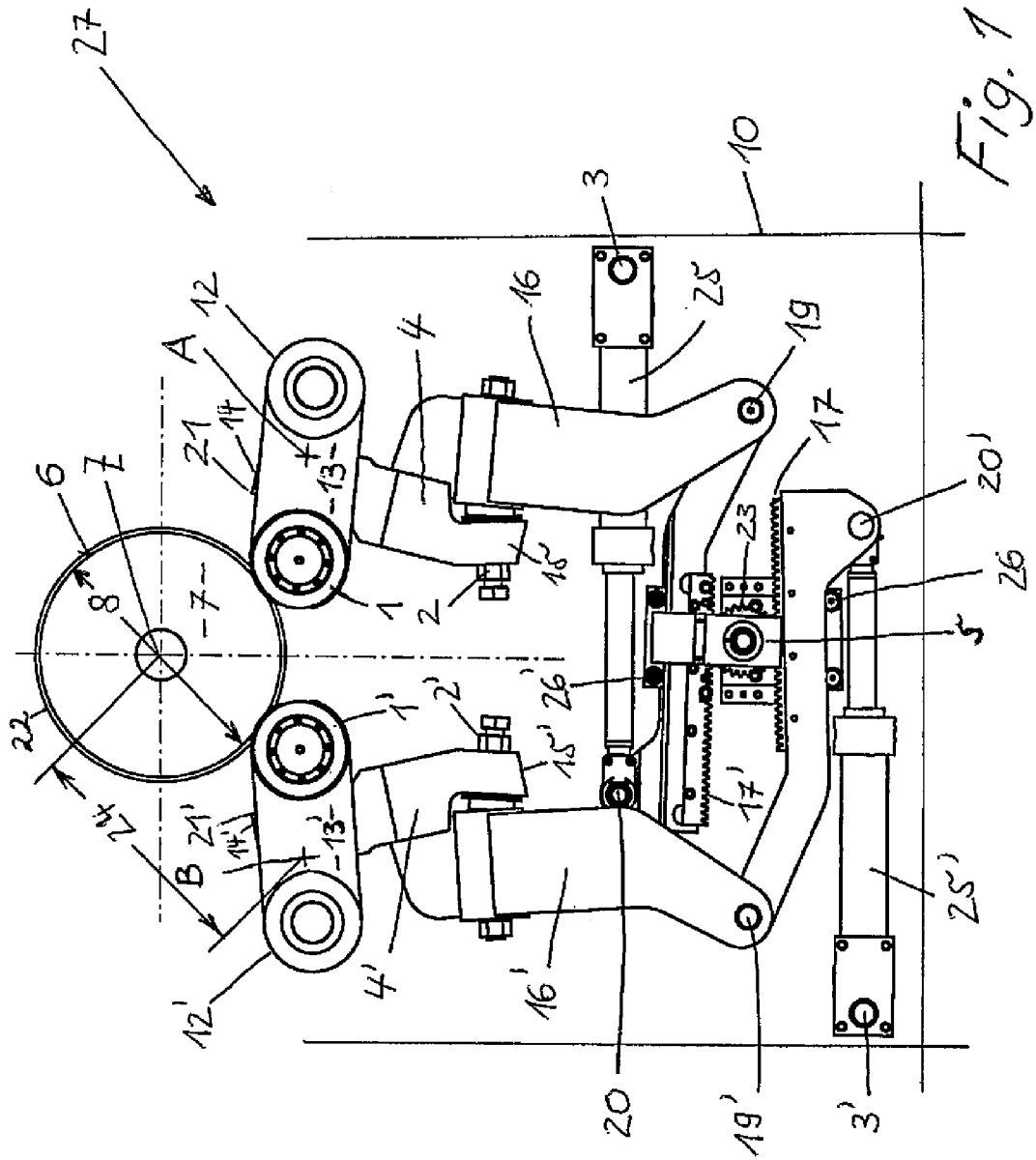
Figure 2:
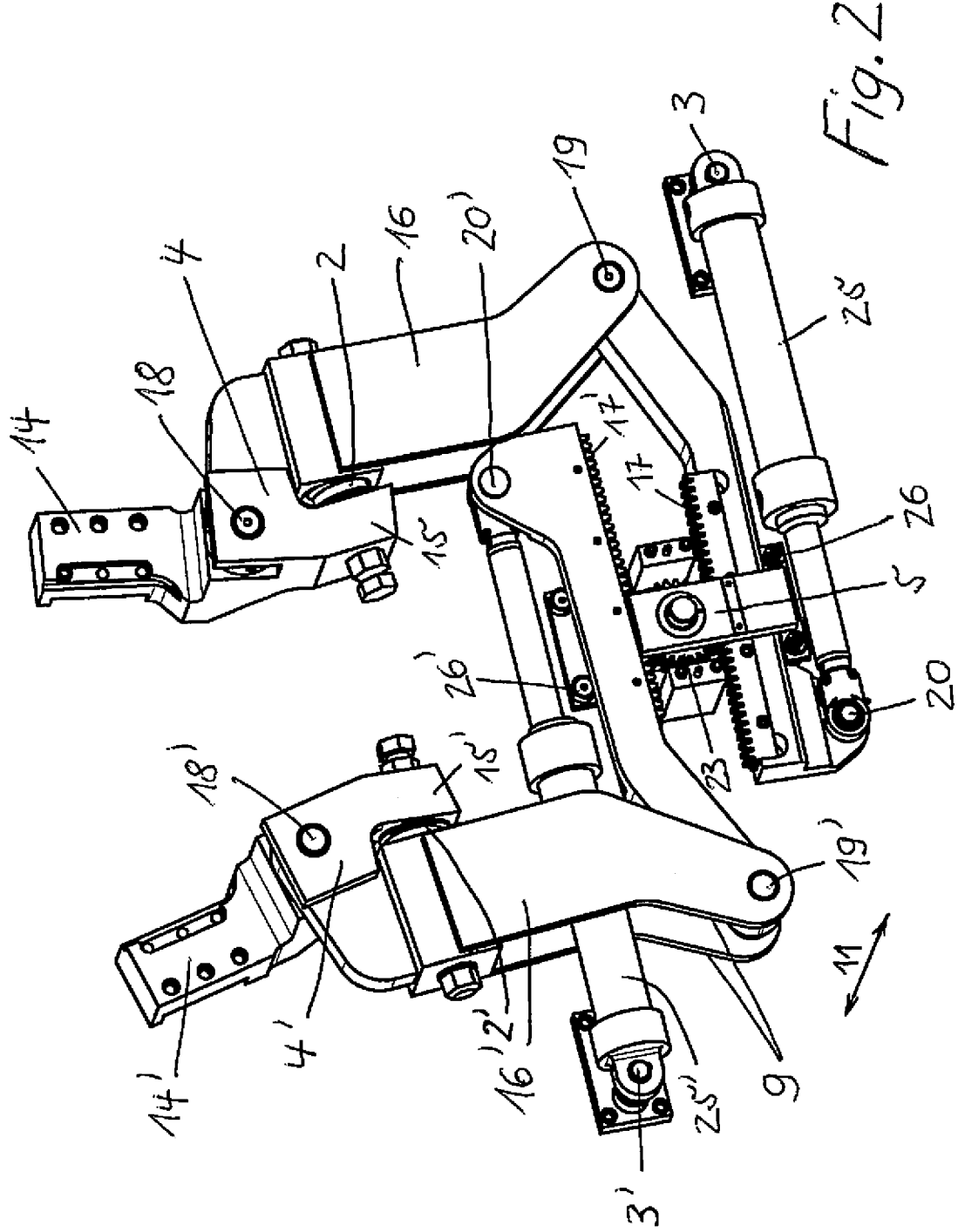

The invention is described in detail below using a design example. Shown in each simplified depiction are in FIG. 1, the front view of a lift drive; and FIG. 2, the lift drive from FIG. 1 in a perspective view.

DETAILED DESCRIPTION

Two drive rollers 1,1' (FIGS. 1 and 2) each form a roller pair and are each mounted on the free end 21,21' of a roller carrier rocker 12,12' so as to be both rotatable and drivable; all-in-all, the under-floor wheelset lathe 27 has two roller pairs. The roller carrier rocker 12,12' comprises both a rocker 13,13' and the first rocker lever 4,4'. The rocker 13,13' and the first rocker lever 4,4' are firmly connected to the first end 14,14' of the rocker lever 4,4'. The two rockers 13,13' can both be mounted pivotably around one swivel axis A or B in machine stand 10. The machine stand 10 is depicted simplified in FIG. 1 through an outline.

The swivel axes A,B run at a radial distance 24 parallel to rotational axis Z for wheelset 22, whereby the wheelset 22 is supposed to show the workpiece with the largest possible diameter 8 of wheel 7 that can be machined on the under-floor wheelset lathe 27. Correspondingly different diameters 8 for the wheels 7 in wheelset 22 if the position of the rockers 13,13' is approaching horizontal for the machining of large wheel diameters, whilst the position can be pointing slightly upwards from the vertical plane for machining small wheel diameters.

The two free second ends 15,15' of the rocker lever 4,4' are each flexibly connected to a roughly horizontal lifting cylinder 25,25' via the first joints 18,18', second joints 19,19' and third joints 20,20'. Simultaneously, an intermediate lever 16,16' engages in an articulate manner at each of the joints 18,18' and 19,19'.

The intermediate levers 16,16' are each flexibly connected to a toothed rack 17,17' via the joints 19,19'.

The power cylinders 25,25' engage in an articulate manner at each other end of the toothed racks 17,17'. Fastenings 3,3' are used to fasten each of the power cylinders 25,25' to the machine stand 10 articulately.

The two toothed racks 17,17' engage in pinion 23 (which is also mounted in machine stand 10 so as to be rotatable) in a positive connection on the sides opposite one another. The engagement of the two toothed racks 17,17' in pinion 23 is secured by roller guides 26,26' in each case, thus ensuring that the toothed racks 17,17' cannot get out of mesh when engaging with pinion 26. The roller guides 26,26' are also fastened in the machine stand 10.

To ensure that the drive rollers 1,1' are always making force-fit contact with running tread 6 for wheels 7 in wheelset 22 and can follow all out-of-roundness or imperfections in running tread 6, an elastic link in the form of a compression spring 2,2' is interconnected between the rocker levers 4,4' and the intermediate levers 16,16'. In the example, the compression springs 2,2' are each located in close proximity to the joints 18,18', which are used for flexibly connecting the rocker levers 4,4' to the intermediate levers 16,16'.

A particularly low vertical construction is attained for the lift drive in drive rollers 1,1' through the almost horizontal arrangement of the two power cylinders 25,25' and thus the two accompanying toothed racks 17,17'. The arrangement of the intermediate levers 16,16' in double shank design 9, particularly easy to recognise in FIG. 2, allows a low construction height to be achieved along the rotational axis Z for wheelset 22, even in depth extent 11. Good accessibility and facilitated adjustability of the compression springs 2,2' is also guaranteed through the proposed design.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

REFERENCE NUMERAL LIST 1, 1' Drive roller
2, 2' Compression spring 3, 3' Fixing
4, 4' Rocker lever
5 Pinion bearing
6 Running surface
7 Wheel
8 Wheel diameter
9 Double shank
10 Machine stand
11 Depth extent
12, 12' Roller carrier rocker
13, 13' Rocker body
14, 14' First end
15, 15' Second end
16, 16' Intermediate lever
17, 17' Toothed rack
18, 18' Joint
19, 19' Joint
20, 20' Joint
21, 21' Free end
22 Wheelset
23 Pinion
24 Radial distance
25, 25' Power cylinder
26, 26' Roller guide
27 Under-floor wheelset lathe
A,B Swivel axis
Z Rotational axis

The invention claimed is:

1. An under-floor wheelset lathe for machining the profiles of wheels or brake discs of wheelsets for railway vehicles using cutting tools, while the wheelset is rotatably mounted around its rotational axis in axle bearing housings, with clamping elements for gripping the axle bearing housings for the wheelset, of which one is intended for each front end of a machine stand of the underfloor wheelset lathe, and uses two drive rollers forming a roller pair for each of two wheels on the wheelset for lifting, driving and lowering the wheelset prior to, during or after the machining process, wherein each drive roller is mounted at a free end of a roller carrier rocker so as to be both rotatable and drivable;

wherein the roller carrier rocker is made up of a rocker body and a rocker lever which are firmly connected to each other on a first end of the rocker lever, while the roller carrier rocker in the machine stand is mounted in a swiveling arrangement around a swivel axis which runs at a radial distance and parallel to the rotational axis of the wheelset and the free, second end of the rocker lever is positively connected to the other drive roller of the roller pair via at least one intermediate lever and joints; and wherein the positive connection between the two drive rollers comprises:

two toothed racks which engage in a joint pinion, the toothed racks each being flexibly connected, respectively, to a power cylinder and an intermediate lever, the toothed racks being supported by a roller guide on a respective side opposite to the pinion engagement while the power cylinders are both fixed to the machine stand using fasteners in an articulate arrangement.

2. The under-floor wheelset lathe in accordance with claim 1, wherein the power cylinders are arranged almost horizontally.

3. The under-floor wheelset lathe in accordance with claim 1, wherein the toothed racks are arranged almost horizontally.

4. The under-floor wheelset lathe in accordance with claim 1, wherein the toothed racks engage in the joint pinion from sides opposite one another.

5. The under-floor wheelset lathe in accordance with claim 1, wherein a compression spring is arranged between one rocker lever and at least one respectively associated intermediate lever.

6. An under-floor wheelset lathe for machining the profiles of wheels or brake discs of wheelsets for railway vehicles, comprising:

first and second drive rollers, the first and second drive rollers forming a roller pair for each of two wheels on the wheelset;

first and second roller carrier rockers mounted in a machine stand for the lathe in a swiveling arrangement around a swivel axis which runs at a radial distance and parallel to a rotational axis of the wheelset, each roller carrier rocker comprising a rocker body and a rocker lever, the rocker body connected to a first end of the rocker lever;

wherein the drive rollers are rotatably mounted at the first ends of the rocker bodies;

wherein the second ends of the rocker levers are linked to the other of the drive rollers by a connection comprising:

first and second intermediate levers;

a rack and pinion comprising first and second racks that engage a single pinion, the first and second racks each being supported by corresponding first and second roller guides that are located on respective sides of the racks opposite to the pinion; and first and second power cylinders; and wherein respective first ends of the first and second racks are pivotably connected to corresponding first ends of the power cylinders;

wherein respective second ends of the first and second racks are pivotably connected to corresponding intermediate levers; and wherein respective second ends of the power cylinders are pivotally fixed to the machine stand.

\* \* \* \* \*

UNITED STATES PATENT AND TRADEMARK OFFICE
CERTIFICATE OF CORRECTION

| | |
|---|---|
| PATENT NO. | : 9,138,809 B2 |
| APPLICATION NO. | : 13/703280 |
| DATED | : September 22, 2015 |
| INVENTOR(S) | : Hans-Joachim Reiche |

It is certified that error appears in the above-identified patent and that said Letters Patent is hereby corrected as shown below:

On the Title Page:

In col. 1, (30) Foreign Application Priority Data, the phrase "20 2010 007 239" should be replaced with --20 2010 007 239.5--.

In the Claims:

In col. 3, claim 1, line 35, the phrase "underfloor" should be replaced with --under-floor--.

Signed and Sealed this
Sixteenth Day of August, 2016

Michelle K. Lee
*Director of the United States Patent and Trademark Office*